United States Patent
Naghian et al.

(10) Patent No.: US 7,512,783 B2
(45) Date of Patent: Mar. 31, 2009

(54) PROVISION OF SECURITY SERVICES FOR AN AD-HOC NETWORK

(76) Inventors: Siamäk Naghian, Kaurakaski 2 E 2, FIN-02320 Espoo (FI); Tero Kärkkäinen, Pehkosuonkatu 17 A 23, FIN-33820 Tampere (FI)

( * ) Notice: Subject to any disclaimer, the term of this patent is extended or adjusted under 35 U.S.C. 154(b) by 893 days.

(21) Appl. No.: 10/464,863

(22) Filed: Jun. 19, 2003

(65) Prior Publication Data

US 2004/0179502 A1 Sep. 16, 2004

Related U.S. Application Data

(60) Provisional application No. 60/454,306, filed on Mar. 14, 2003.

(51) Int. Cl.
H04L 9/00 (2006.01)
G06F 15/16 (2006.01)
G06F 17/30 (2006.01)
G06F 7/04 (2006.01)
H04K 1/00 (2006.01)
G06K 9/00 (2006.01)

(52) U.S. Cl. .............. 713/155; 713/175; 713/176; 380/270; 726/4; 726/29

(58) Field of Classification Search ............... 713/175, 713/176, 155; 380/270; 726/4, 29
See application file for complete search history.

(56) References Cited

U.S. PATENT DOCUMENTS

2002/0009199 A1* 1/2002 Ala-Laurila et al. ......... 380/247
2002/0036991 A1* 3/2002 Inoue ...................... 370/328
2002/0124169 A1* 9/2002 Agrawal et al. ............. 713/168
2002/0141586 A1 10/2002 Margalit et al.
2003/0235174 A1* 12/2003 Pichna et al. ............... 370/338

(Continued)

FOREIGN PATENT DOCUMENTS

EP 1 146 692 A2 10/2001

(Continued)

OTHER PUBLICATIONS

3GPP. "EAP Support in smartcards and security requirements in WLAN authentication", May 2003.*

(Continued)

*Primary Examiner*—Kambiz Zand
*Assistant Examiner*—Michael J Simitoski

(57) ABSTRACT

A method and apparatus provide security services in an ad-hoc network. In order to provide security services, a set of user identities is transmitted from a first ad-hoc node to a second network external to the ad-hoc network. The set of user identities includes user identities related to at least one ad-hoc node. A first set of authentication parameters is generated in the external network. The first set of authentication parameters includes an authentication vector for each user identity included in the set of user identities and each authentication vector including a second set of authentication parameters. Some of the authentication parameters of the second set are transferred to the first ad-hoc node, whereby a third set of authentication parameters is received at the first ad-hoc node. The third set of authentication parameters is utilized at the first ad-hoc node for providing a security service in the ad-hoc network.

23 Claims, 5 Drawing Sheets

U.S. PATENT DOCUMENTS

2003/0235175 A1* 12/2003 Naghian et al. ............ 370/338

FOREIGN PATENT DOCUMENTS

| WO | WO 02/063847 A2 | 8/2002 |
|---|---|---|
| WO | WO 02/073874 A2 | 9/2002 |

OTHER PUBLICATIONS

Durresi, Arjan et al. "Secure 3G User Authentication in Adhoc Serving Networks", 2006 IEEE.*

Fitzek, F. et al. "Security and Authentication Concepts for UMTS/WLAN Convergence", 2003 IEEE.*

Antipolis, Sophia, "IMS authentication and integrity/confidentially protection", Nov. 2000.*

Ala-Laurila J. et al. "Wireless LAN Access Network Architecture for Mobile Operators" IEEE Communications Magazine, Nov. 2001, pp. 82-89.

* cited by examiner

PROVISION OF SECURITY SERVICES FOR AN AD-HOC NETWORK

CROSS-REFERENCE TO RELATED APPLICATIONS

This application claims priority of U.S. Provisional Application Ser. No. 60/454,306 entitled, "Provision of Security Services for an Ad-Hoc Network," filed Mar. 14, 2003, the entire contents of which are incorporated herein by reference.

BACKGROUND OF THE INVENTION

1. Field of the Invention

The invention relates generally to ad-hoc networks. More specifically, the invention relates to a method for providing security services for a local ad-hoc network, especially for a mobile ad-hoc network (MANET). The security services here refer to mechanisms that support the accomplishment of authenticity, confidentiality, and/or integrity within the ad-hoc network.

2. Description of the Related Art

The rapid development towards truly mobile computing and ubiquitous networking has brought on the evolvement of so-called ad-hoc networks, which offer unrestricted mobility without any underlying infrastructure. The nodes of an ad-hoc network are often mobile, in which case the network is called a mobile ad-hoc network (MANET). Unlike traditional wireless networks, ad-hoc networks thus lack an underlying infrastructure, such as base stations. Instead, all the nodes of an ad-hoc network share the responsibility of network formation and management. In an ad-hoc network, each node therefore acts as a router transmitting messages to other nodes of the network, and the messages between two nodes located far apart from each are relayed by intermediate ad-hoc nodes. Standalone ad-hoc networks are useful at least whenever it is impossible to use a fixed network infrastructure due to geographical, terrestrial, or time constraints, for example. Local ad-hoc networks can also be integrated into legacy networks, such as mobile networks. The dynamically changing topology of an ad-hoc network sets high requirements for the routing protocols used in the ad-hoc nodes. This is one reason why activities in the development of the ad-hoc networks have for the present related mainly to the routing aspects.

Because of the basic characteristics of the ad-hoc networks, the handling of security aspects also becomes problematic: there is no infrastructure for handling the creation, storage and distribution of security keys, for example. Furthermore, an ad-hoc network, with wireless links connecting the nodes, is easily exposed to security attacks, such as eavesdropping, Denial of Service (DoS), impersonation, etc. Moreover, authentication and authorization cannot be performed similarly as in conventional wireless networks.

Due to the above reasons, ad-hoc networks need a robust security architecture.

The security features that have been developed so far for the ad-hoc networks have mainly been an integrated part of the routing functions. In other words, the security aspects of the ad-hoc networks have concentrated mainly on the link/route security. Therefore, the overall management of the security issues of the ad-hoc networks has not yet been resolved in an adequate manner. These security issues include the above-mentioned key issues such as authentication, integrity, and encryption.

The invention relates to the problem of handling the security aspects of ad-hoc networks, especially mobile ad-hoc networks.

SUMMARY OF THE INVENTION

The invention seeks to improve the security features of the ad-hoc networks and to bring about a new mechanism for providing security services for ad-hoc networks.

In the invention, an ad-hoc network, which is local in nature, collects a set of ad-hoc user identities and sends it to an external network, such as a cellular network, where authentication parameters are generated for the identities similarly as for any subscriber of the cellular network. At least part of the generated parameters are returned to the ad-hoc network where they can be used for providing security services, such as for authenticating one or more ad-hoc nodes. In the invention, the ad-hoc networks are thus regarded as semi-infrastructured networks, in which the provision of security services to the ad-hoc nodes is supported by means of connectivity to an overlaying network infrastructure.

Thus one embodiment of the invention is the provision of a method for providing security services for ad-hoc nodes. The method includes the steps of:

transmitting a set of user identities from a first ad-hoc node to a network external to the first ad-hoc node, the set of user identities including user identities related to at least one ad-hoc node;

generating a first set of authentication parameters in the external network, the first set of authentication parameters including an authentication vector for each user identity included in the set of user identities and each authentication vector including a second set of authentication parameters;

transferring at least some of the authentication parameters of at least one second set of authentication parameters to the first ad-hoc node, whereby a third set of authentication parameters is received at the first ad-hoc node; and utilizing the third set of authentication parameters at the first ad-hoc node for providing a security service for at least one other ad-hoc node.

In a further embodiment the invention provides a system for providing security services for ad-hoc nodes. The system includes:

first signaling means for transmitting a set of user identities from a first ad-hoc node to a network external to the first ad-hoc node, the set including user identities related to at least one ad-hoc node;

in the external network, authentication means for generating a first set of authentication parameters, the first set of authentication parameters including an authentication vector for each user identity included in the set of user identities and each authentication vector including a second set of authentication parameters;

second signaling means for transferring a third set of authentication parameters to the first ad-hoc node, the third set including at least some of the authentication parameters of at least one second set, and;

service provision means for utilizing the third set of authentication parameters for providing a security service for at least one ad-hoc node other than the first ad-hoc node.

In another embodiment the invention provides an ad-hoc node for providing security services in an ad-hoc network. The ad-hoc node includes:

first signaling means for transmitting a set of user identities to a second network external to the ad-hoc network, the set of user identities including user identities related to at least one ad-hoc node;

second signaling means for receiving a first set of authentication parameters from the second network, and service provision means for providing a security service in the ad-hoc network, the service provision means being configured to utilize the first set of authentication parameters received by the second signaling means.

One advantage of the invention is that the security services may easily be extended to local ad-hoc networks, and such services can be provided for ad-hoc nodes regardless of their location within the ad-hoc network, and also regardless of the network configuration and topology.

A further advantage of the invention is that it is in line with the development of security features in mobile and IP networks.

Other features and advantages of the invention will become apparent through reference to the following detailed description and accompanying drawings.

BRIEF DESCRIPTION OF THE DRAWINGS

In the following, the invention and its preferred embodiments are described more closely with reference to the examples shown in FIG. 1 to 6 in the appended drawings, wherein.

DETAILED DESCRIPTION OF THE PREFERRED EMBODIMENTS

Figure 1:
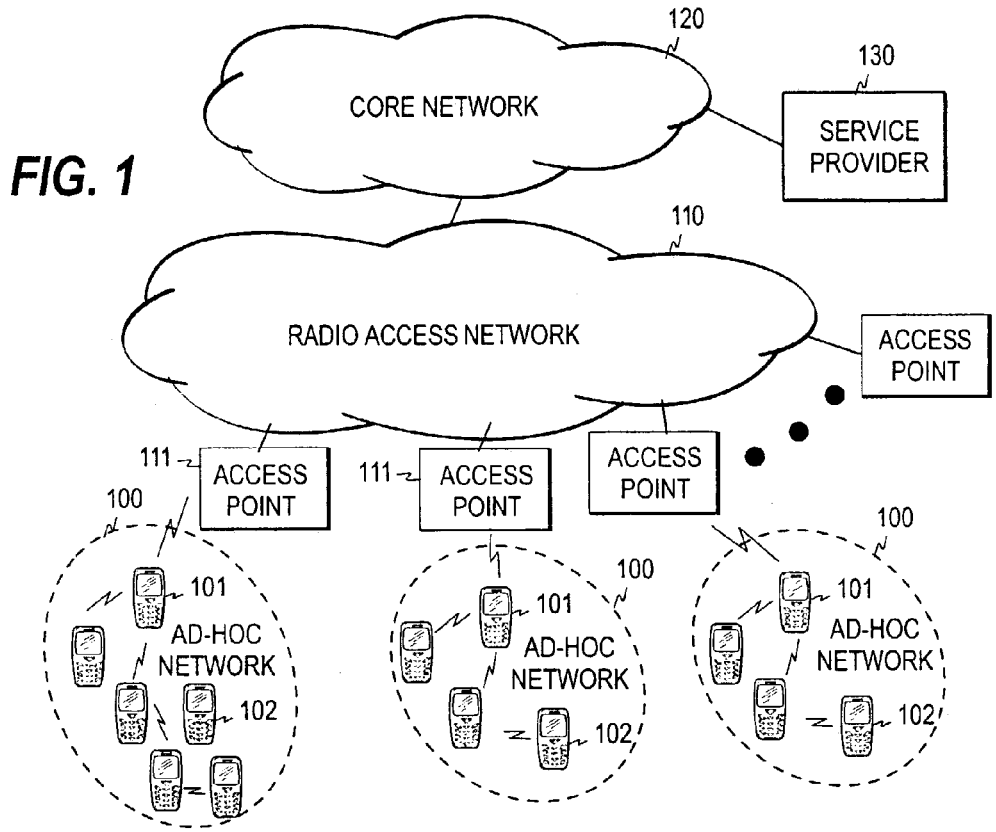
FIG. 1 illustrates a general communication system according to the invention.

FIG. 1 illustrates a general communication system according to the invention. The system includes three interacting domains: one or more ad-hoc networks 100, a radio access network 110, and a core network 120. The radio access network includes one or more access points 111, such as base stations or WLAN access points, through which the ad-hoc networks are connected to the radio access network. Each ad-hoc network includes at least one trunk node 101, which communicates with an access point of the radio access network, and at least one other ad-hoc node 102 for which the trunk node provides security services. The trunk node thereby acts as an access point or gateway for other ad-hoc nodes in the ad-hoc network in question. The other nodes may be located at different distances from the trunk node, measured as the number of hops between the node and the trunk node, i.e. the trunk node does not have to have a direct connection to each of the other nodes. However, the messages between the trunk node and an ad-hoc node located further than one hop apart from the trunk node are relayed by intermediate ad-hoc nodes. Therefore, inside a sub-network served by a trunk node, a connection may involve the end nodes and one or more intermediate nodes. The ad-hoc nodes may also form different sub-networks. It may be further assumed here that each ad-hoc node is provided with a (U)SIM ((Universal) Subscriber Identity Module). As discussed below in connection with FIG. 6, a trunk node may also serve more than one ad-hoc network, and with different radio interfaces.

Each local ad-hoc network is thus connected to an overlaying network infrastructure including at least a radio access network and a core network. The radio access network and/or the core network may further be connected to one or more external networks, such as the Internet. As discussed below, the overlaying network infrastructure supports the security features of the Subscriber Identity Modules (SIMs) of the ad-hoc nodes, whereby the SIM security services can be extended to the local ad-hoc networks. The core network and/or the external network typically include service providers 130.

Figure 2:
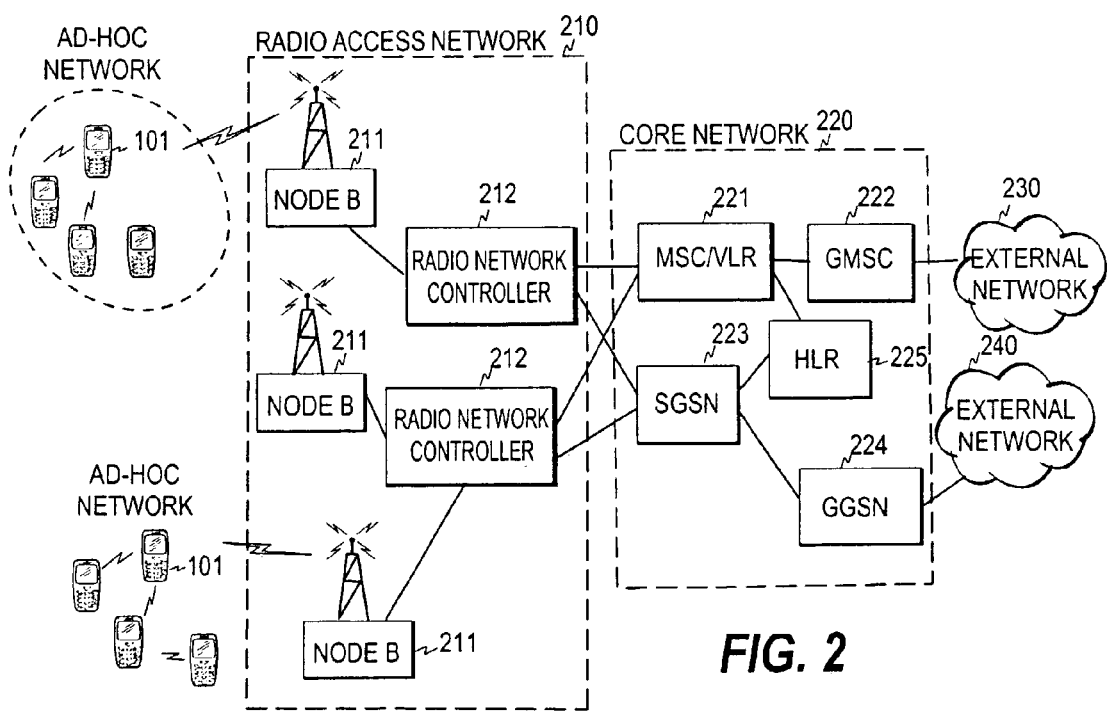
FIG. 2 illustrates one example of the communication system of FIG. 1 according to an embodiment of the invention.

FIG. 2 illustrates one embodiment of the system of the invention, the overlaying network being a cellular network. In this context, terms commonly used in connection with a Universal Mobile Telecommunication System (UMTS) architecture are used to describe the overlaying cellular network. Thus in this case the radio access network is a UMTS Terrestrial Radio Access Network (UTRAN) 210 and the access points are node B elements 211, which are the physical units for radio transmission/reception in the cellular network. In addition to the node B elements, the UTRAN further includes Radio Network Controllers (RNC) 212, each of which is connected through the Iub interface to a set of node B elements. Each Radio Network Controller is responsible for the control of the radio resources within its domain, i.e. in the set of node B elements connected to it. The Radio Network Controllers 212 form the service access points for the services the UTRAN provides to the Core Network 220.

The Core Network is divided into circuit-switched and packet-switched domains, the former being responsible for the traditional circuit-switched services and the latter for packet-switched services. The circuit-switched domain is connected via a Mobile services Switching Centre (MSC) 221 and the packet-switched domain via a Serving GPRS Support Node (SGSN) 223 to the Radio Access Network.

The MSC includes a Visitor Location Register (VLR), which is a database holding a copy of a visiting user's service profile and information on the location of the mobile station. The MSC/VLR is connected through a Gateway MSC 222 to external circuit-switched networks 230, such as Public Switched Telephone Networks (PSTNs).

The SGSN is connected to a Gateway GPRS Support Node (GGSN) 224, which connects the Core Network to external packet-switched networks 240, such as the Internet. The SGSN and the GGSN have functionalities similar to those of the MSC/VLR and GMSC, respectively, but in relation to packet-switched services. Some network elements of the Core Network, such as the Home Location Register (HLR) 225, are shared by both domains. The servers providing services may be located within the CN or the external networks.

Figure 3:
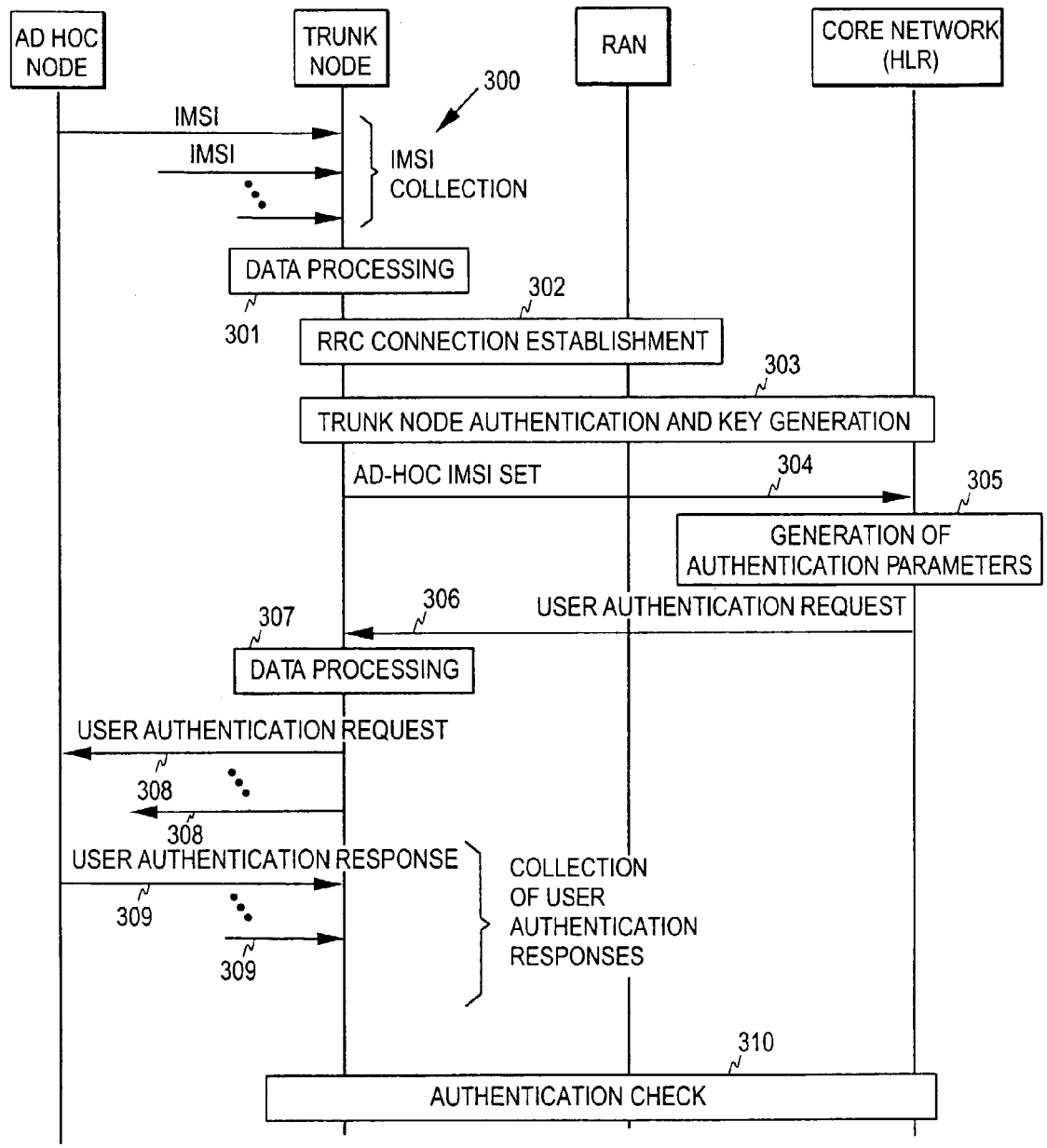
FIG. 3 illustrates the message exchange in the communication system of FIG. 2 according to an embodiment of the invention.

FIG. 3 illustrates the operation of the system shown in FIG. 2 by illustrating the message exchange between the different parties of the system. First, a trunk node 101 collects the International Mobile Subscriber Identities (IMSIs) from a set of ad-hoc nodes (step 300). This set includes one or more ad-hoc nodes served by the trunk node, each of the ad-hoc nodes being served over one or more hops, depending on the number of other ad-hoc nodes between the trunk node and the concerned ad-hoc node. The trunk node maintains a node-specific record for each of the served ad-hoc nodes and therefore generates such records at step 301 by storing the IMSI, if such records have not been generated earlier (step 301). After this, and in case there is no RRC connection established between the trunk node and the backbone network, an RRC connection is established between the trunk node and the UTRAN, i.e. over the Uu interface (step 302). When this control plane signaling connection has been established, the trunk node is authenticated in a known manner (step 303), i.e. similarly as any mobile station entering the cellular network.

After a successful authentication, the ad-hoc IMSI set collected at step 300 is sent from the trunk node to the Authentication Centre (AuC) of the CN, which in this case is the HLR (step 304). The AuC then generates an authentication vector for each of the IMSIs in a known manner (step 305), each vector containing a network challenge (RAND), an expected user response (XRES), a network authentication token (AUTN), a cipher key (CK), and an integrity key (IK). These parameters are called the authentication parameters in this context.

It is now assumed that the RAND and the AUTN related to each ad-hoc IMSI are returned to the trunk node in a user authentication request (step 306). The trunk node then stores the the parameters (step 307) and forwards each parameter pair (RAND/AUTN) to the corresponding ad-hoc node (step 308). Since the distance between the trunk node and some of the served ad-hoc nodes may be greater than one hop, the trunk node may further add some trunk node specific information, such as its IMSI, to the messages sent to the ad-hoc nodes. The information proves that the message originates from the real trunk node, i.e. that none of the intermediate ad-hoc nodes has taken the role of the trunk node, for example.

In the ad-hoc node the authentication parameters received from the trunk node are transferred to the USIM, which calculates output parameters based on the received authentication parameters, the master key K stored in the USIM, and the authentication algorithm. The output parameters include a user response (RES), a sequence number (SQN), the cipher key (CK), and the integrity key (IK). The user response is transferred from each ad-hoc node to the trunk node (step(s) 309), provided that the sequence number is acceptable, as it normally is if the session has not been attacked. In other words, the user responses are collected at the serving trunk node.

Having received the responses from the ad-hoc networks, the trunk node performs an authentication check (step 310). This can be performed in different ways. First, the trunk node may transfer the authentication response(s) to the AuC. In this case, the AuC compares the authentication response(s) to the corresponding expected user response(s) (XRES) calculated by the AuC. The AuC then informs the result of each authentication to the trunk node, which in turn informs the relevant ad-hoc nodes. Second, the trunk node may calculate expected user response(s) itself and perform the above-mentioned comparison. In this case, the trunk node informs the AuC and each ad-hoc node of the result of each authentication.

It was assumed above that RAND and the AUTN related to each IMSI were sent to the trunk node from the AuC. However, it is also possible that the expected user response(s) are sent from the AuC to the trunk node, whereby the trunk node can directly compare an expected user response received from the AuC to the corresponding user response received from the AuC. The trunk node may then inform the ad-hoc nodes and the CN of the result of the authentication.

As indicated above, the ad-hoc IMSI set collected at step 300 and sent to the supporting infrastructure at step 304 may include the IMSI of one or more ad-hoc nodes. If the set includes a plurality of IMSIs, it is also possible that the above steps are performed separately for each of the IMSIs. Namely each of the served ad-hoc nodes is authenticated one at a time. However, in order to reduce the signaling traffic towards the infrastructure, it is advantageous to send, whenever possible, a plurality of IMSIs at a time to the supporting infrastructure. Therefore, it is advantageous to buffer the IMSIs in the trunk node, whenever possible.

Figure 4:
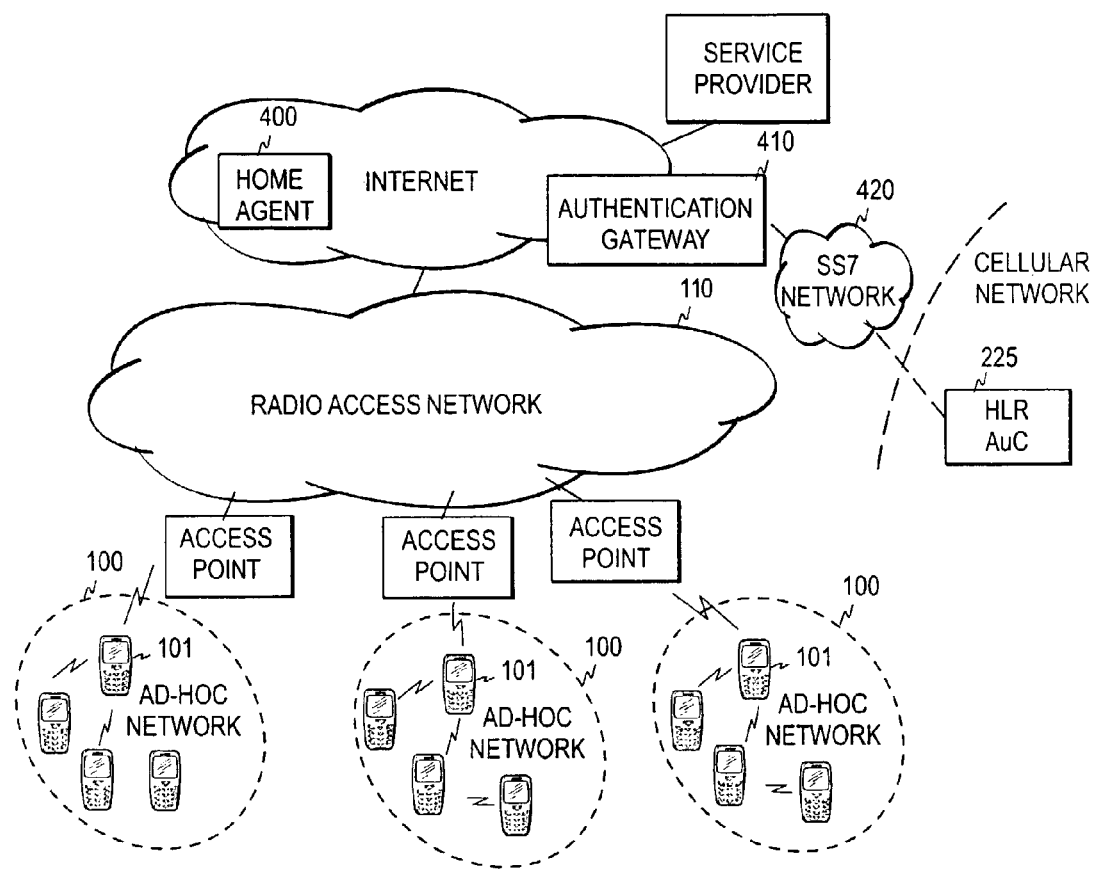
FIG. 4 illustrates another example of the communication system of FIG. 1 according to an embodiment of the invention.

FIG. 4 illustrates another embodiment of the system of the invention. In this embodiment, the overlaying network infrastructure includes an IP network, such as the Internet. The connection to the cellular network (i.e. to the network including the AuC) is established through the home agent 400 of the trunk node and through an authentication gateway 410, which is a network element that authenticates the traffic to be transmitted from the IP network to the cellular network. The authentication gateway is connected to the cellular network through an SS7 network 420, for example. According to the embodiments of the invention, the interface to the cellular network may vary according to the cellular network and according to the future development of the cellular networks.

Figure 5:
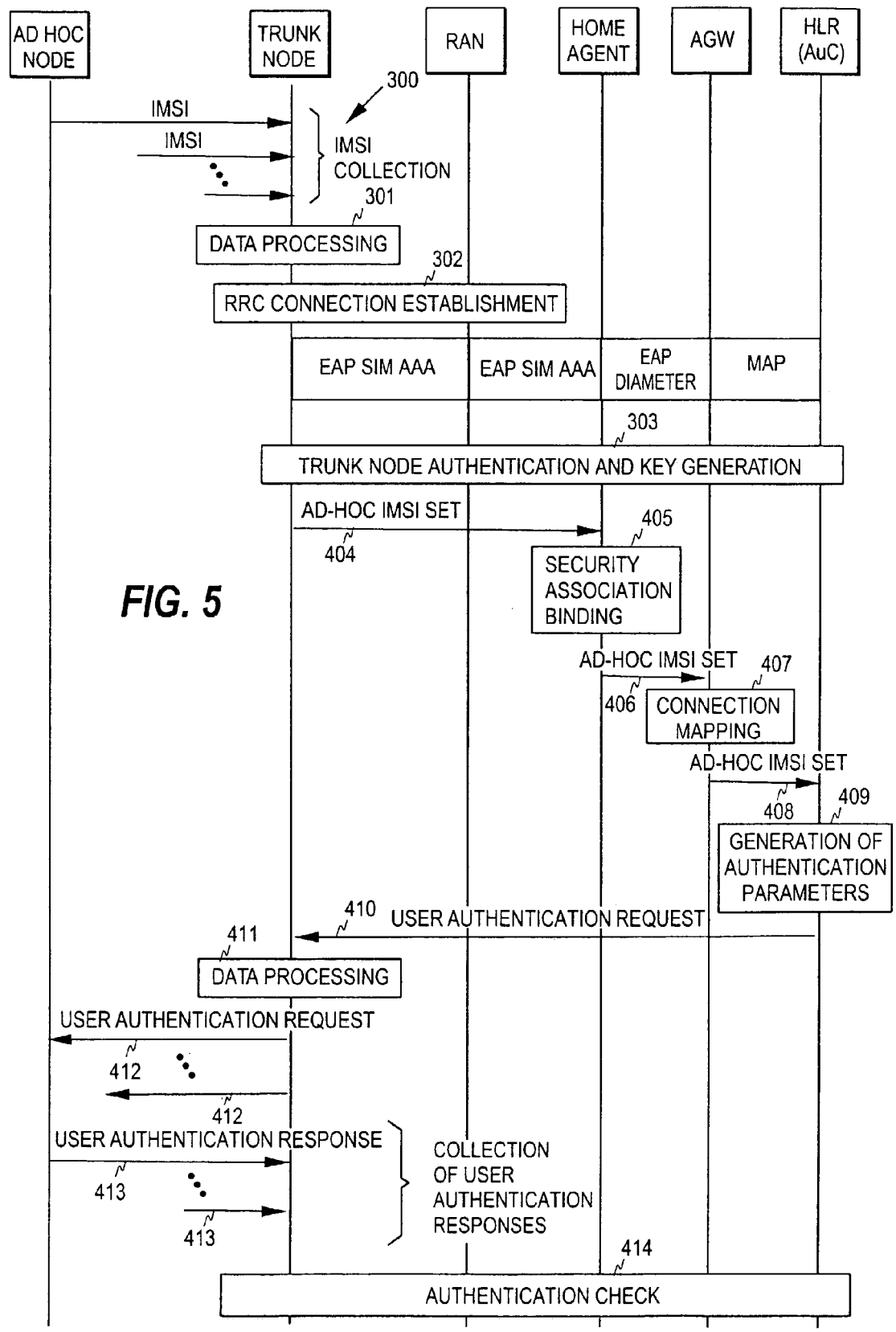
FIG. 5 illustrates the message exchange in the communication system of FIG. 4 according to an embodiment of the invention.

FIG. 5 illustrates the operation of the system shown in FIG. 4 by illustrating the message exchange between the different entities of the system. The operation corresponds mainly to the message exchange described in connection with FIG. 3, except that the different protocols used may cause certain changes. The protocols are for example as shown in FIG. 3 after step 302, for instance, an EAP SIM protocol can be used on the links from the radio access network to the home agent, an EAP Diameter protocol may be used between the home agent and the authentication gateway, and the MAP (Mobile Application Part) protocol may be used between the authentication gateway and the HLR (AuC).

When the trunk node has been authenticated at step 303, the IMSI set of the ad-hoc nodes is transferred to the home agent (step 404), which then performs a security association binding at step 405 in order to be able to transfer data from one secured connection (between the trunk node and the home agent) to another (between the home agent and the authentication gateway). The ad-hoc IMSI set is then forwarded to the authentication gateway (step 406). The authentication gateway maps the (secured) IP connection to the connection established towards the cellular network (step 407) and transmits the ad-hoc IMSI set to the HLR (step 408).

The rest of the process is similar to the process described above, i.e. authentication parameters are returned to the to the trunk node, which then collects the user responses from the ad-hoc nodes (steps 410 to 413). The trunk node then performs the above-described authentication check, which can be performed in various ways, as described above.

In the invention, existing network infrastructure and existing SIM-based authentication protocols are used to provide security services through a certain ad-hoc node (trunk node) to a set of ad-hoc nodes, which may be located at different distances from the trunk node (measured as the number of hops between the node and the trunk node). If every node of the ad-hoc network is able to access the external infrastructure, any one of the ad-hoc nodes can act as the trunk node.

If several ad-hoc nodes within one ad-hoc network are capable of acting as the trunk node, these ad-hoc nodes can act as the trunk node in turn. For example, a node with a high battery capacity may start as the trunk node, and the trunk node can be changed if the battery capacity drops below a certain capacity. A symmetrical authentication can also be performed in the above-described manner: a first ad-hoc node acts as the trunk node and authenticates a second ad-hoc node and then the second ad-hoc node takes the role of the trunk node and authenticates the first ad-hoc node. In this way, both ad-hoc nodes communicating with each other can ensure the identity of the opposite party.

Figure 6:
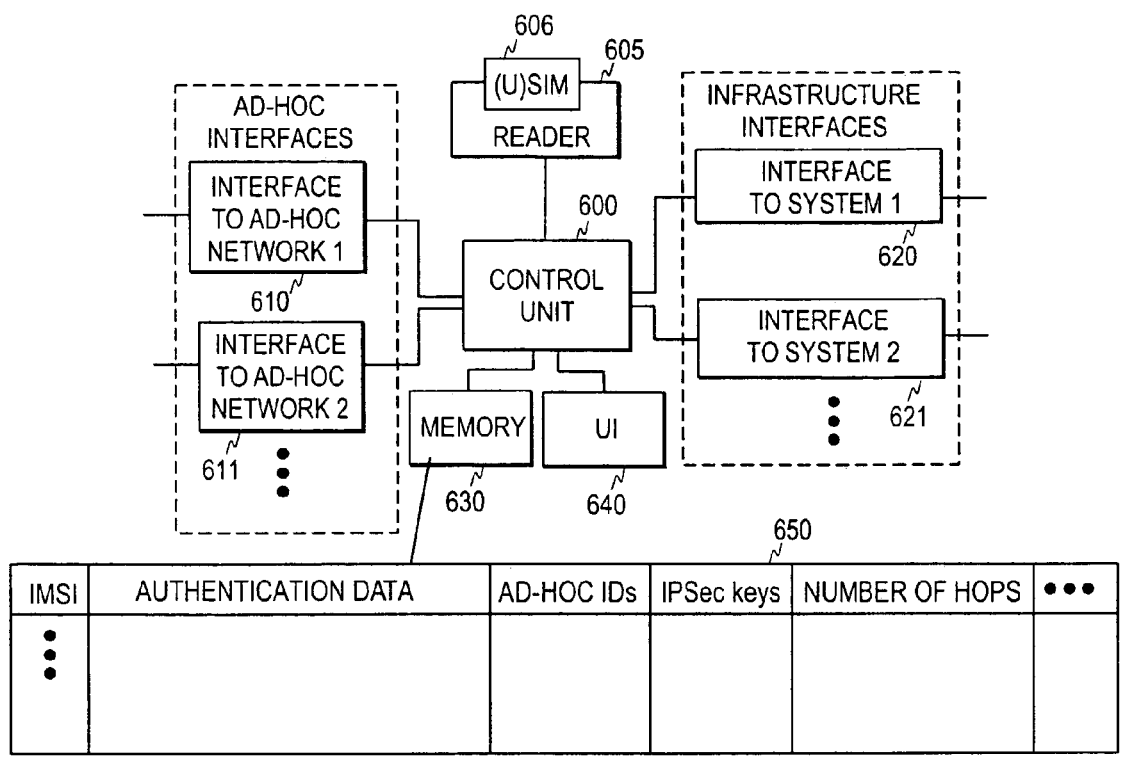
FIG. 6 illustrates a trunk node of a local ad-hoc network according to an embodiment of the invention.

FIG. 6 is a schematic presentation of an ad-hoc trunk node according to the invention. There are two basic prerequisites for the operation of the trunk node: it should be capable of supporting SIM-based authentication and it should be able to access the network infrastructure for establishing a connection to the HLR (i.e. the AuC). The latter feature may involve a protocol conversion between the protocol used within the ad-hoc network and the protocol used between the trunk node and the radio access network.

The core of the trunk node is a control unit 600, which is connected to various interfaces of the trunk node. The interfaces can be divided into two classes: interfaces for ad-hoc networks and interfaces for the network infrastructure. The ad-hoc interfaces include one or more interfaces 610, 611, each offering the functionality needed to accomplish connectivity to an ad-hoc network of a particular type. Several ad-hoc interfaces may be necessary, at least whenever the trunk node serves ad-hoc networks based on different technologies. For example, one ad-hoc network served may be based on Wireless Local Area Network (WLAN) technology, while another one may be based on Bluetooth technology.

The interfaces to the supporting infrastructure also include one or more interfaces 620, 621, each offering the functionality needed to accomplish connectivity to a system (i.e. network infrastructure) of a particular type. For example, interface 611 may offer connectivity to a GSM or UMTS network, while interface 612 offers connectivity to a WLAN network.

The trunk node further includes a card reader 605 into which a (U)SIM card 606 can be inserted, and a memory unit 630. The card reader and the memory unit are connected to the control unit in order that the control unit is able to read data from the (U)SIM and from the memory unit and write data into the (U)SIM and into the memory unit. In addition, the trunk node includes user interface means 640 for using the trunk node. The user interface means typically include a display and a keypad. The structure of the trunk node may also be modular so that it includes a standalone ad-hoc module separate from a module containing the infrastructure interface. The ad-hoc module of the trunk node may then utilize the SIM of the infrastructure interface over a short-range radio connection, such as a Bluetooth connection.

The memory unit 630 includes a secured memory area storing information about the set of ad-hoc nodes served by the trunk node, preferably in the form of ad-hoc node specific records, as is shown in the figure. For each IMSI received from the ad-hoc nodes, this memory area may include, for example, the following information: the authentication data related to the node, the ad-hoc level identities of the node, the IPSec keys used by the node, the distance to the node measured as the number of hops between the node and the trunk node, etc. The ad-hoc identities may include the layer 2 and 3 addresses of the ad-hoc nodes, for example. The layer 3 address may be the global IPv6 address of the node, while the layer 2 address may be a Medium Access Control (MAC) address, for example. The authentication data includes the parameters calculated in the trunk node and received from the AuC and from the node.

Above, it was assumed that every ad-hoc node is provided with (U)SIM functionality. However, the trunk node may also provide security services to ad-hoc nodes without a (U)SIM. With respect to such an ad-hoc node, the trunk node assumes the role of a certification entity, i.e. the role of a trusted third party providing security key management. The network infrastructure assists the trunk node in generating the security keys based on the (U)SIM of the trunk node. For example, the trunk node can generate a pair of public and private keys in the above-described manner. The trunk node may then distribute its public key to the desired ad-hoc nodes to be used by the ad-hoc nodes.

The trunk node may also generate the security parameters, such as fresh keys, independently of the ad-hoc nodes served. In this case, the security parameter(s) is/are "leased", the "lease" being valid for a certain time and/or as long as certain conditions are met. For example, the trunk node may retrieve the necessary information periodically, such as once a day, from the network infrastructure and use the retrieved information for one day for providing security services to the ad-hoc nodes. In this way the signaling traffic to the supporting network infrastructure can be reduced.

In this way, the trunk node uses its SIM algorithm for providing a set of security parameters, for example credentials and their check values, for the nodes within its sub-network, or in association with proximity communication with devices around it. Under certain conditions (time span, service area, etc.), or at the time of ad-hoc network formation, this information can be used to authenticate the ad-hoc nodes involved in an ad-hoc connection. Therefore, the authentication key and parameters for ad-hoc usage can easily be extracted, downloaded, and exchanged in a short-term ad-hoc situation, and destroyed when there is no need for them, making the authentication process local and fast. Also, the authentication parameters can be distributed or downloaded within the proximity area/sub-network even prior to the network formation, for example between fixed devices (e.g. content servers, vending machines, etc.) that are potential to become part of the ad-hoc network or otherwise be involved in proximity communication. By doing so, the ad-hoc nodes can be authorized locally by using the parameters downloaded from the SIM of the initiator ad-hoc node. Since the process of the invention can thus be performed before or in connection with the formation of the ad-hoc network, or in connection with proximity communication between the trunk node and one or more ad-hoc nodes, the term "ad-hoc network" refers in this context generally to the ad-hoc nodes communicating locally via a short-range radio (i.e. the trunk node and one or more other ad-hoc nodes).

The method of the invention may be implemented when the ad-hoc user is also a mobile subscriber. Even though it is likely that an ad-hoc user is also a mobile subscriber (i.e. that the user has a mobile phone), it is also possible that the operator creates a virtual mobile subscription in case the ad-hoc user has no mobile phone. The virtual subscription then involves the generation of the information (IMSI, master key K) needed to calculate the authentication vectors in the AuC, such as the HLR. The mobile trunk node may manage such virtual subscriptions.

Although the invention was described above with reference to the examples shown in the appended drawings, it is obvious that the invention is not limited to these, but may be modified by those skilled in the art without departing from the scope and spirit of the invention. For example, the technologies on which the ad-hoc networks and the overlaying networks are based, the SIM-based parameters exchanged, and the functional split for the security handling may vary. Furthermore, the types and number of the authentication parameters generated in the external network and/or transmitted to the trunk node may vary.

What is claimed is:

1. A method for providing security services for ad-hoc nodes, the method comprising:
  receiving a set of user identities as a group from a first node of an ad-hoc network at a second node of a network external to the ad-hoc network, the set of user identities including user identities of a plurality of nodes of the ad-hoc network;

generating an authentication vector for each user identity of the received set of user identities, the authentication vector including a plurality of authentication parameters; and for each user identity of the set of user identities, sending an authentication parameter of the plurality of authentication parameters associated with each user identity from the second node to the first node.

2. The method of claim 1, wherein the authentication parameter is sent in a user authentication request message.

3. The method of claim 1, wherein the authentication vector includes one or more parameters selected from a network challenge, an expected user response, a network authentication token, a cipher key, and an integrity key.

4. The method of claim 1, wherein a second plurality of authentication parameters is sent.

5. The method of claim 4, wherein the second plurality of authentication parameters comprise a network challenge and a network authentication token.

6. The method of claim 5, wherein the second plurality of authentication parameters further includes an expected user response.

7. The method of claim 1, further comprising:
receiving a set of authentication responses from the first node at the second node;
comparing the received set of authentication responses with an expected user response generated as part of the authentication vector for each user identity of the set of user identities; and
for each user identity of the set of user identities, sending an authentication result based on the comparison from the second node to the first node.

8. A method for providing security services for ad-hoc nodes, the method comprising:
receiving a user identity from each of a plurality of nodes of an ad-hoc network at a first node of the ad-hoc network;
sending a set of user identities as a group from the first node to a second node of a network external to the ad-hoc network, the set of user identifies comprising the received user identity from each of the plurality of nodes;
receiving a set of authentication parameters from the second node at the first node, the set of authentication parameters including an authentication parameter associated with each user identity of the plurality of nodes; and
sending the authentication parameter associated with each user identity of the plurality of nodes to a node of the plurality of nodes associated with the user identity.

9. The method of claim 8, further comprising:
receiving an authentication response from a third node of the ad-hoc network at the first node; and
sending the authentication response from the first node to the second node.

10. The method of claim 9, further comprising:
receiving an authentication result from the second node at the first node; and
sending the authentication result from the first node to the third node of the ad-hoc network.

11. The method of claim 8, wherein the set of authentication parameters includes a network challenge and a network authentication token associated with each user identity of the plurality of nodes.

12. The method of claim 11, wherein the set of authentication parameters further includes an expected user response associated with each user identity of the plurality of nodes.

13. The method of claim 12, further comprising:
receiving an authentication response from a third node of the ad-hoc network at the first node;
comparing the received authentication response with the expected user response associated with the third node; and
sending an authentication result based on the comparison from the first node to the third node.

14. The method of claim 11, wherein the set of authentication parameters further includes a cipher key and an integrity key associated with each user identity of the plurality of nodes.

15. The method of claim 14, further comprising:
receiving an authentication response from a third node of the ad-hoc network at the first node;
calculating an expected user response of the third node at the first node based on the cipher key and the integrity key associated with the third node;
comparing the received authentication response with the calculated expected user response at the first node; and
sending an authentication result based on the comparison from the first node to the third node.

16. The method of claim 15, further comprising sending the authentication result based on the comparison from the first node to the second node.

17. A node for providing security services for ad-hoc nodes, the node comprising:
a network interface configured to receive a set of user identities as a group from a first node of an ad-hoc network, wherein the node is part of a network external to the ad-hoc network, the set of user identities including user identities of a plurality of nodes of the ad-hoc network;
an authentication unit configured to generate an authentication vector for each user identity of the received set of user identities, the authentication vector including a plurality of authentication parameters; and
the network interface further configured to send, to the first node, an authentication parameter of the plurality of authentication parameters for each user identity of the set of user identities.

18. The node of claim 17, wherein:
the network interface is further configured to receive a set of authentication responses from the first node;
the authentication unit is further configured to compare the received set of authentication responses with an expected user response generated as part of the authentication vector for each user identity of the set of user identities; and
the network interface is further configured to send, to the first node, an authentication result based on the comparison for each user identity of the set of user identities.

19. A node for providing security services for ad-hoc nodes, the node comprising:
a first network interface configured to receive a user identity from each of a plurality of nodes of an ad-hoc network, wherein the node is part of the ad-hoc network;
a second network interface configured to send a set of user identities as a group to a second node of a network external to the ad-hoc network, the set of user identities comprising the received user identity from each of the plurality of nodes, and to receive a set of authentication parameters from the second node, the set of authentication parameters including an authentication parameter associated with each user identity of the plurality of nodes; and the first network interface further configured to send the authentication parameter associated with each user identity of the plurality of nodes to a respective node of the plurality of nodes associated with the user identity.

20. The node of claim 19, wherein the first network interface is further configured to receive an authentication response from the respective node, and further wherein the received set of authentication parameters includes an expected user response associated with each user identity of the plurality of nodes, the node further comprising:
    a control unit configured to compare the received authentication response with the expected user response associated with the respective node;
    wherein the first network interface is further configured to send an authentication result based on the comparison to the respective node.

21. The node of claim 19, wherein the first network interface is further configured to receive an authentication response from the respective node, the node further comprising:
    a control unit configured to calculate an expected user response associated with the respective node based on the received set of authentication parameters, and to compare the received authentication response with the calculated expected user response;
    wherein the first network interface is further configured to send an authentication result based on the comparison to the respective node.

22. The node of claim 21, wherein the second network interface is further configured to send the authentication result from the first node to the second node.

23. A system for providing security services for ad-hoc nodes, the system comprising:
    a first node that is part of an ad-hoc network; and
    a second node of a network external to the ad-hoc network;
    wherein the first node comprises
        a first network interface configured to receive a user identity from each of a plurality of nodes of the ad-hoc network;
        a second network interface configured to send a set of user identities as a group to the second node, the set of user identities comprising the received user identity of the plurality of nodes, and to receive a first set of authentication parameters from the second node; and
        the first network interface further configured to send an authentication parameter associated with each user identity of the plurality of nodes to a node of the plurality of nodes associated with the user identity; and
    further wherein the second node comprises a third network interface configured to receive the set of user identities from the first node;
        an authentication unit configured to generate an authentication vector for each user identity of the received set of user identities, the authentication vector including a second plurality of authentication parameters; and
        the third network interface further configured to send the first set of authentication parameters to the first node, the first set of authentication parameters including the authentication parameter associated with each user identity of the plurality of nodes and the first set of authentication parameters including one or more of the second plurality of authentication parameters.

* * * * *

UNITED STATES PATENT AND TRADEMARK OFFICE
CERTIFICATE OF CORRECTION

PATENT NO. : 7,512,783 B2  Page 1 of 1
APPLICATION NO. : 10/464863
DATED : March 31, 2009
INVENTOR(S) : Naghian et al.

It is certified that error appears in the above-identified patent and that said Letters Patent is hereby corrected as shown below:

On the title page,

[*] Notice:   Subject to any disclaimer, the term of this patent is extended or adjusted under 35 USC 154(b) by 893 days Delete the phrase "by 893 days" and insert -- by 1153 days --

Signed and Sealed this

Thirteenth Day of April, 2010

David J. Kappos
*Director of the United States Patent and Trademark Office*